United States Patent [19]
Martin

[11] 3,805,624
[45] Apr. 23, 1974

[54] COMBINED LATHE WITH INTEGRAL WORK PIECE BALANCING ACCESSORY

[76] Inventor: Joseph D. Martin, 8439 Jefferson Hwy., New Orleans, La. 70123

[22] Filed: Oct. 27, 1972

[21] Appl. No.: 301,317

[52] U.S. Cl.......................... 73/462, 73/473, 73/477
[51] Int. Cl.......................... G01m 1/04, G01m 1/22
[58] Field of Search...... 73/460, 462, 487, 471–478, 73/66

[56] References Cited
UNITED STATES PATENTS

| 3,090,237 | 5/1963 | Ongaro | 73/462 |
| 2,740,298 | 4/1956 | Swearingen | 73/478 |
| 2,722,465 | 11/1955 | Ellis | 73/66 X |
| 3,572,620 | 3/1971 | Kincaid | 73/462 |

*Primary Examiner*—James J. Gill
*Attorney, Agent, or Firm*—Pugh & Laiche

[57] ABSTRACT

A standard type of lathe having integrally associated therewith a work piece balancing accessory system which is mounted on the lathe bed itself and negates the necessity of having a separate, complex and expensive balancing machine which requires the work piece to be removed from the lathe work area. The balancing accessory detects and locates any imbalance in the work piece and indicates where the imbalance occurs.

Two embodiments are disclosed, one (FIGS. 1-6) for relatively small work pieces and the other (FIG. 7) for relatively large work pieces; the two embodiments differing primarily in their rotating work piece drive system, but in other respects being basically the same. In both embodiments the balancing accessory includes two support pedestals which are mounted on the lathe bed by removable shoes and which can be adjusted in their relative heights and can be slid laterally along the lathe bed to thereby accommodate different sized work pieces. When balancing is completed, the support pedestals and their associated equipment are removed by disengaging the shoe mounts and being lifted up and out of the way by lifting lines until needed again. The balancing accessory includes within each pedestal a mechanical imbalance detection system upon which the work piece is mounted and rotated, associated electronic equipment then being used to obtain the necessary information for putting the work piece into balance.

12 Claims, 7 Drawing Figures

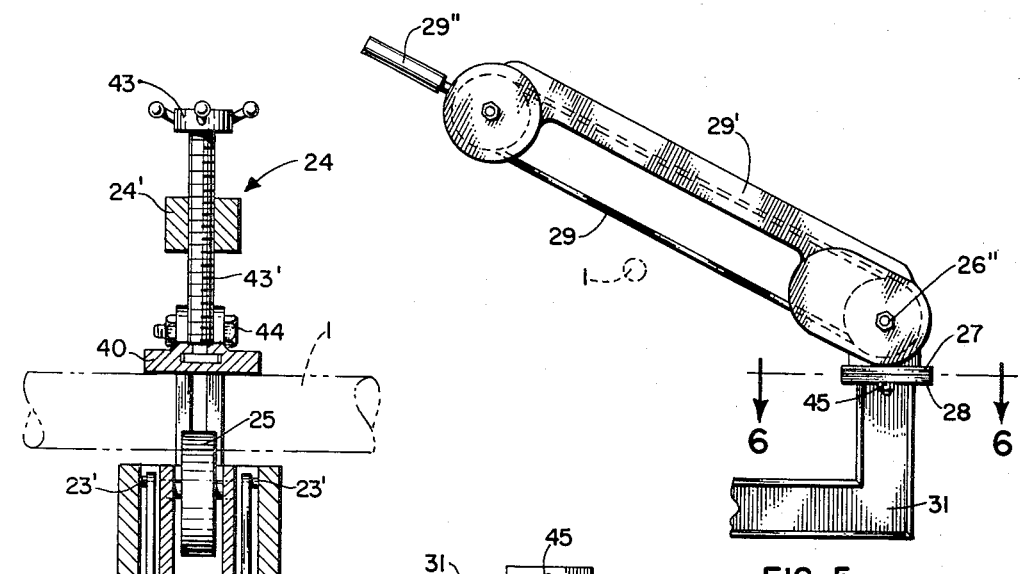
FIG. 5.
FIG. 6.
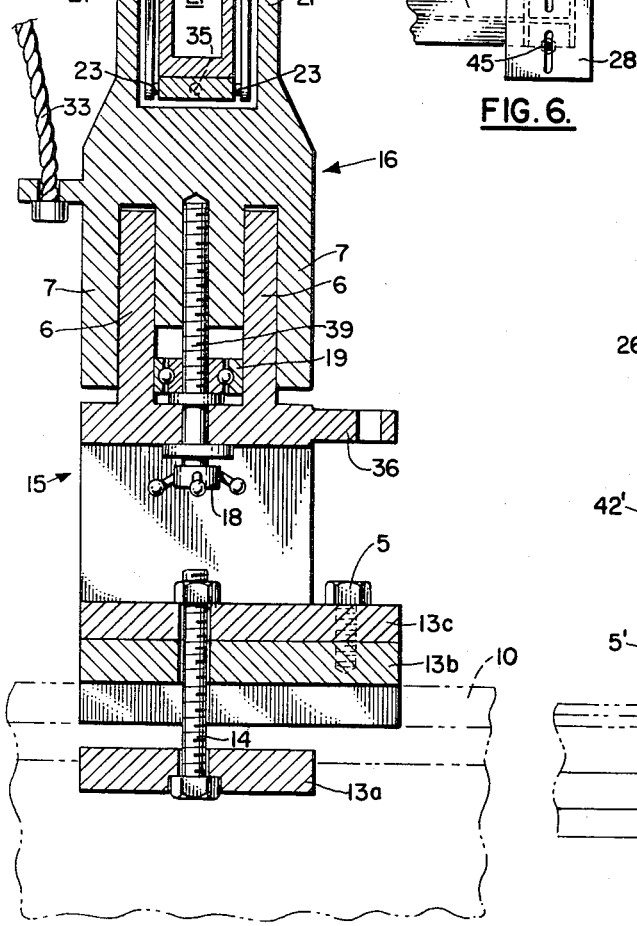
FIG. 4.
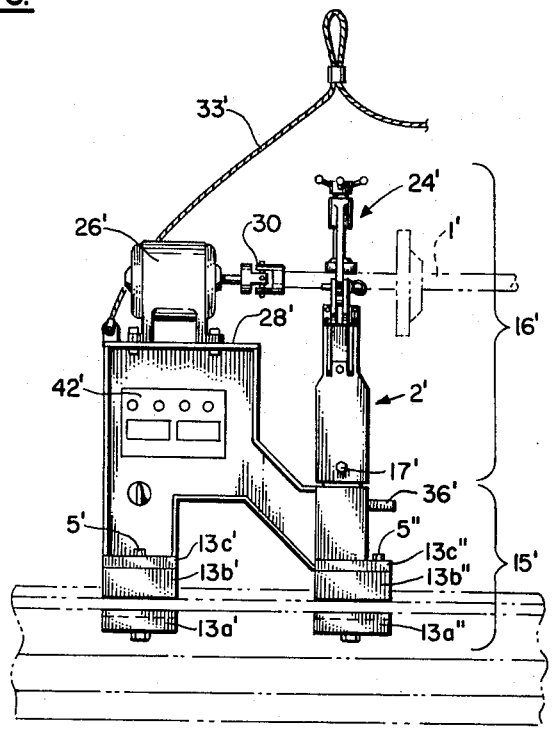
FIG. 7.

COMBINED LATHE WITH INTEGRAL WORK PIECE BALANCING ACCESSORY

BACKGROUND OF THE INVENTION

The present invention relates to a new, simplified balancing machine accessory that is combined with the standard lathe machine and directly mounted on the lathe bed and is used for checking for any imbalance in a work piece that is being machined on the lathe.

The general work done by the lathe and the balancing machine accessory of the present invention consists of rotating at various speeds a work piece such as a shaft, rotor, impeller, armature or other such lathe produced work piece which needs to be symetrically balanced about its central axis, noting or measuring any imbalance in the work piece, and correcting any out of balance by grinding or removing some of the material or adding weights at various points on the work piece as necessary to accomplish a symetrically balanced work piece.

Heretofore, work pieces produced on lathes had to be completely removed from the lathe and the lathe area and then remounted for testing for proper balance on a completely separate balancing machine. After noting any imbalance in the work piece, the work piece would then again have to be removed and brought back to the lathe and remounted for any rework. Such a back-and-forth procedure has been very time consuming and costly.

Moreover, the standard, separate balancing machines of the prior art have also themselves been very expensive (costing for example of the order of $5 to $10 thousand), even to such extent that some smaller machine shops that do lathe work can not afford their own balancing machines and have to send their work elsewhere for testing for proper balance. In the latter instances, such back-and-forth procedures of the prior art are particularly time consuming and expensive.

The present invention overcomes and eliminates these problems of the prior art by means of a balancing accessory machine or structure which is both reliable and economical and can be mounted directly on the standard lathe bed. As a result, the present invention allows the work piece to be tested right on the lathe bed, doing away with a lot of now unnecessary extra handling and expense. Moreover it achieves this result with a device that can be manufactured and sold at a very economical price, within the range of even the smallest machine shop.

One of the great expenses of the standard, prior art, separate balancing machines was caused by the need to provide a heavy, highly stable bed or base upon which to mount the machine's imbalance measuring and testing equipment. The present invention totally eliminates this cost by using the lathe bed itself as a base or bed on hich to mount its equipment. Moreover, in combining the balancing apparatus and the lathe, not only is there a great cost and time reduction, but there is also greater ease and simplicity in producing the finished work piece.

In addition to these very broad, advantageous results and achievements, many other objects and advantages will become apparent from the detailed description of the preferred embodiments below.

BRIEF DESCRIPTION OF THE DRAWINGS

For a better understanding of the nature and objects of the invention, reference should be had to the following detailed description, taken in conjunction with the accompanying drawings, in which like parts are given like reference numerals and wherein:

FIG. 1 is a side, full-width view of a first, light weight embodiment of the combined lathe/balancing machine of the present invention (with the basic lathe equipment and lathe bed illustrated in phantom lines) showing an impeller in phantom lines as a typical work piece in position to be checked for balance; while FIG. 4 is a side, cross-sectional view, taken along section lines 4—4, of the support pedestal of FIG. 2.

FIG. 5 is a partial, end view of the work piece motor drive for rotating the work piece during balance checking, taken along section lines 5—5 of FIG. 1; and FIG. 6 is a top, cross-sectional view of the motor mount for the motor drive, taken along section lines 6—6 of FIG. 5.

FIG. 7 is a side, partial view, showing one support pedestal, with the motor drive mounted thereon of a second, heavy duty embodiment of the combined lathe/balancing machine of the present invention with the work piece mounted ready for balance checking, the lathe bed and the work piece being shown in phantom lines.

DETAILED DESCRIPTION OF THE PREFERRED EMBODIMENTS

Two different embodiments of the balancing machine accessory of the present invention are described herein, both having the same basic design but a different work piece drive system. The first (FIGS. 1-6) is a lighter machine which employs a light, belt-driving mechanism for faster, lighter work; while the other (FIG. 7) is a heavier machine having a direct-in-line-drive motor with a universal coupling for heavier work.

For purposes of this disclosure, a typical lathe machine is generally illustrated in phantom lines and includes a lathe bed 10, support legs 11, a lathe drive mechanism 8 and a tail stock 9. The lathe bed 10 usually includes two parallel, horizontally disposed, extended, support bars upon which associated equipment can be mounted and moved for positioning along the bars.

Figure 1:
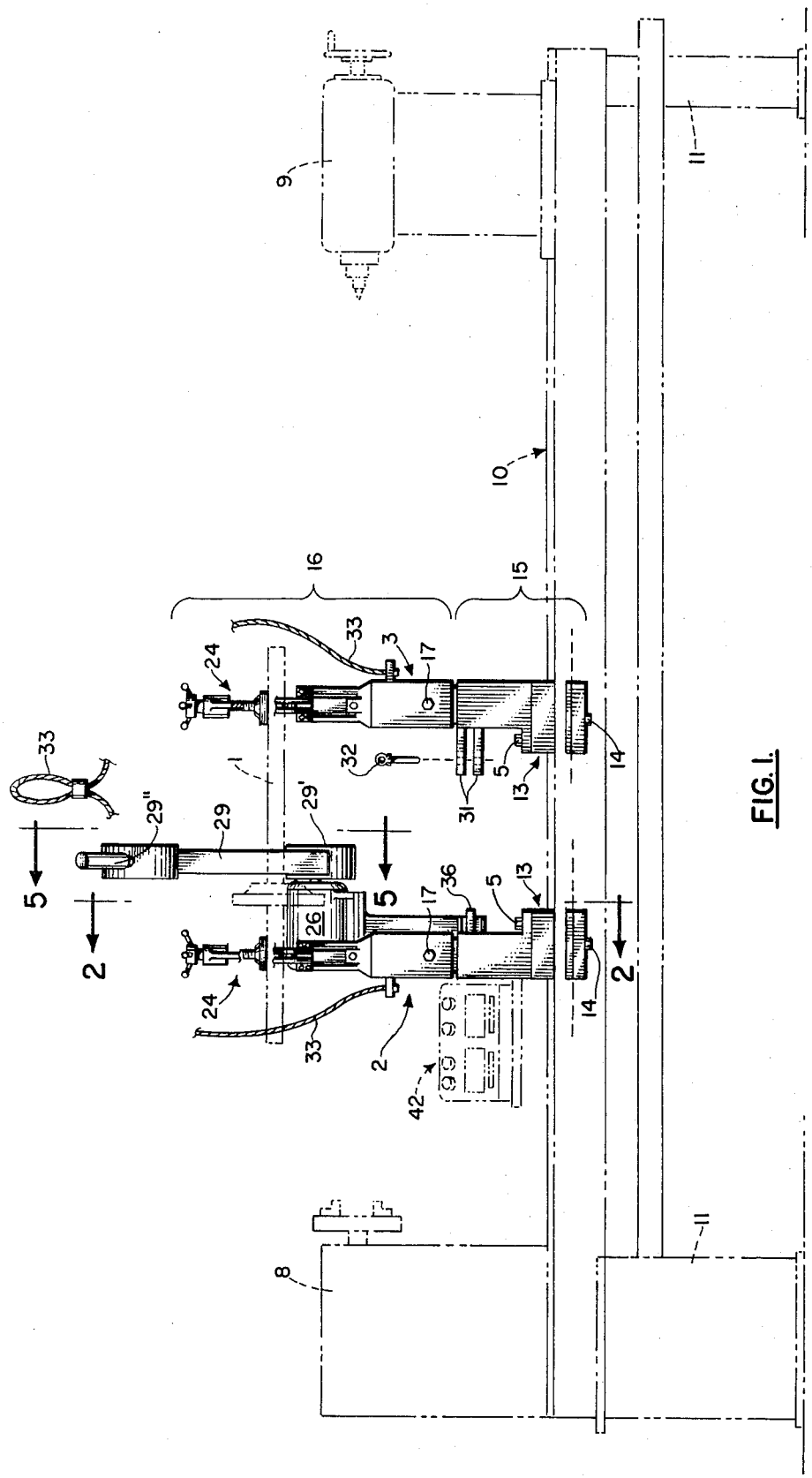

As shown in FIG. 1, the balancing machine accessory of the present invention includes two basic, support pedestals 2, 3 which have at their lower extremity mounting shoes 13 that are especially designed and machined to fit the particular type lathe that the balancing machine accessory of the present invention is to be mounted on. The especially designed shoes 13 are made up of multiple, changeable parts 13a–b (note particularly FIG. 2) so that the balancing machine accessory can be mounted on any lathe regardless of make or type merely by appropriately changing the lower shoe parts 13a and b. By removing the central, main bolt 14 and the side bolts 5, the mounting shoes parts 13a and 13b can be easily removed and replaced by other appropriate parts to allow the same pedestals 2, 3 to be used with any other lathe bed.

Also, when it is desired to remove the support pedestals 2, 3 from the lathe bed 10, the central bolts 14, which serve as hold-down and clamping means, are loosened, and the bottom shoe plates 13a rotated ninety degrees. The pedestals 2, 3 can then be raised up by means of lifting lines or cable 33 and removed from the lathe work area. In putting the machine into use, the opposite procedure is followed.

The pedestals 2, 3 which are supporting the work 1 to be balanced can be slid up and down along the lathe bed 10, allowing the balancing machine accessory to accommodate any length shaft, mandrel, or rotor or other work piece 1, as desired.

Thus, when needed, the pedestals 2, 3 can be set down on the lathe bed 10, the mounting shoes 13 appropriately positioned, the pedestals 2, 3 then positioned along the lathe bed 10 to accommodate the length of the particular work to be balanced, and the hold-down bolts 14 tightened. Upon mounting the work piece and plugging the associated electrical equipment into an electric socket, the balancing machine is ready for use.

After the work has been completed, the work piece 1 can be taken out of the machine. The two hold-down bolts 14 are then loosened, the pedestals 2, 3 slid together in face-to-face contact or juxtaposition, and a lock pin 32 dropped into place into members 21 and 36. The balancing machine accessory can then be quickly removed from the lathe with the aid of the lifting lines or cable 33 and stored away until it is needed again. The lathe is then free for regular machine work.

Figure 2:
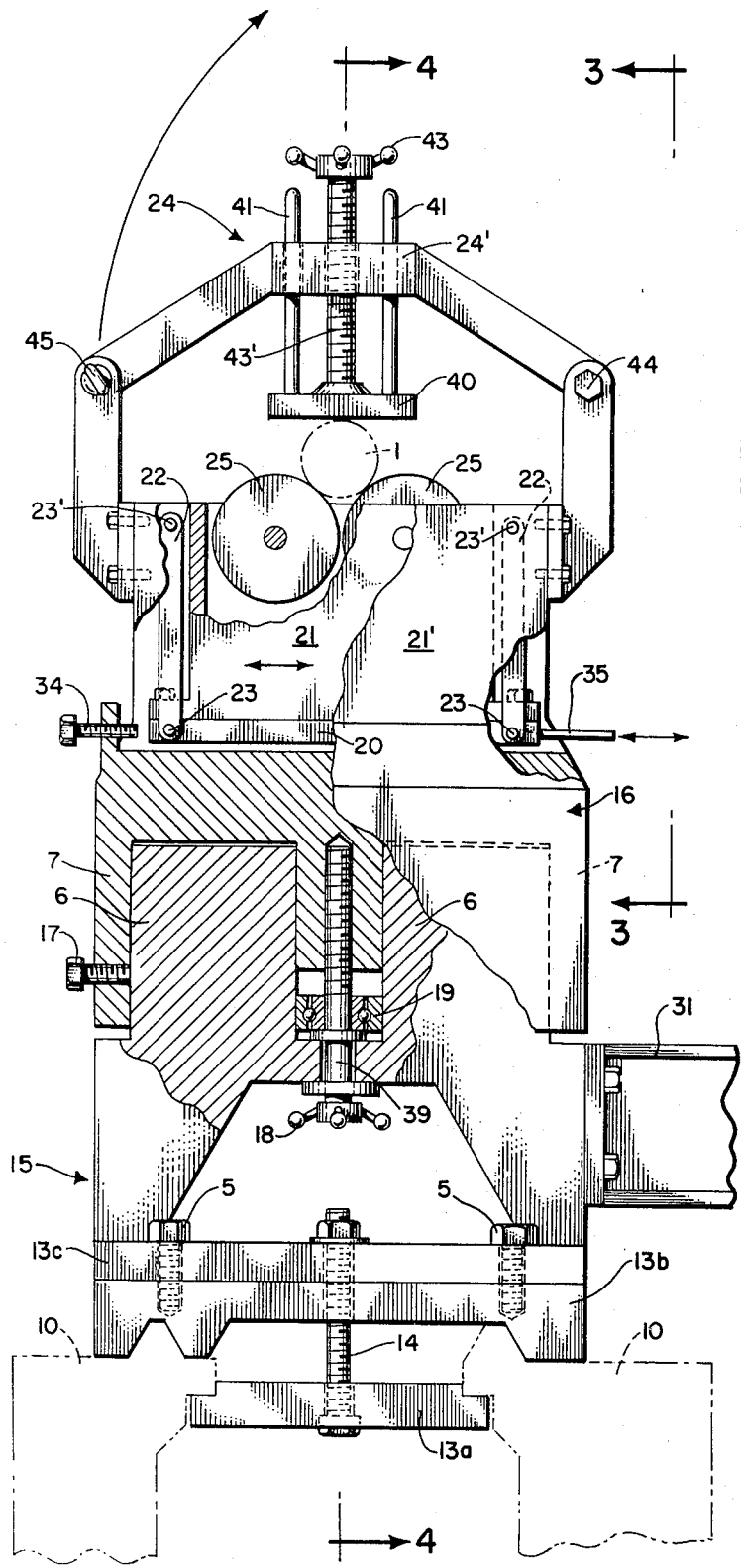
FIG. 2 is an end, cross-sectional view, partially cutaway, showing one of the support pedestal of the balancing apparatus of FIG. 1, taken along section lines 2—2, showing the complete pedestal assembly of the light weight version of the present invention.

As is best seen in FIGS. 2 and 4, each support pedestal 2, 3 consists of two parts or columns, a bottom pedestal half 15 and a top pedestal half 16. The top pedestal half 16 can be raised or lowered with respect to the lower pedestal half 15 to accommodate any change that may occur in the size of shaft or work piece 1 to be balanced from one end or point of contact to the other; thus keeping the work piece perfectly level at all times. As shown in FIGS. 2 and 4, the pedestal halves 15, 16 have interdigitating sections 6/6', 7/7' which complement and mate with each other in face-to-face engagement to allow for lateral support regardless of the relative positions of the pedestals halves.

The relative adjustment between halves 15, 16 is accomplished with the aid of the pedestal adjusting screws 18, which remains vertically fixed with respect to the lower pedestal half 15. Each pedestal adjusting screw 18 has a thrust collar 39 secured to its body which allows it to raise or lower the top pedestal half 16 by merely screwing it up or down on the shaft of the screw 18 as it is rotated.

Directly below the thrust collar 39 is a thrust bearing 19 that actually supports the top pedestal half 16 and all other parts from that point up including the work piece 1 that is being balanced. This thrust bearing 19 allows the top pedestal half 16 to be raised or lowered with complete ease.

The clearance between the sides of the bottom pedestal half 15 and the sides of the top pedestal half 16 can be for example six-thousandths of an inch (0.006) and lubricated for easy, free adjustment. After the necessary adjustment is made in pedestal height, the pedestal locking or set screw 17 is tightened and the two pedestal halves 15, 16 are then locked together and secured.

For purposes of indicating any imbalance, a particular type of mechanical mounting balancing system, which will now be described, has been found to be particularly effective, but of course many other systems are available and could be used instead.

Figure 3:
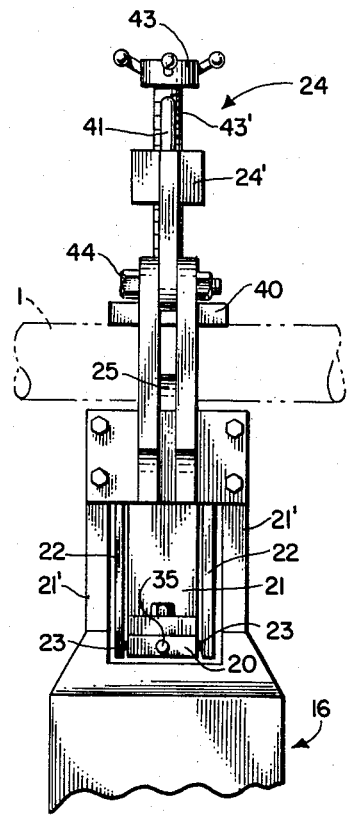
FIG. 3 is a side, partial view, taken along section lines 3—3 of FIG. 2, of the upper portion of the support pedestal of the apparatus of FIGS. 1 and 2.

As best seen in FIGS. 2–4, the work piece 1 is mounted at either end on a set of freely rotatable, balancing rollers 25 which are mounted within carrier swing box 21. The bottom of the carrier swing box 21 is fixedly attached to the carrier swing plate 20 which in turn is carried by carrier swing straps or arms 22 at removable, lower-pivot points 23. Also attached to the bottom of the carrier swing box 21 and swing plate 20 is indicator arm 35. The upper ends of the carrier swing straps 22 are connected to the outer housing 21' of the upper pedestal half 16 at fixed, upper pivot points 23'. As a result of such mountings, the carrier swing box 21 carrying the rollers 25 therein with the indicator arm 35 affixed thereto can swing from side to side (note arrows of FIG. 2) from fixed pivot points 23' with respect to the outer housing 21'.

When the work piece 1 mounted at either end on the rollers 25 as illustrated is rotated, any imbalance is picked up by the carrier swing boxes 21 and translated into swinging motion as indicated by the indicator arms 35. As is standard in prior art balancing machines, the motion of the indicator arm 35 is detected, measured and analyzed by appropriate electronic equipment generally illustrated as element 42 in FIG. 1. If desired, weighted extentions can be suspended from the end of the indicator arms 35 to assist in the indication and readout of any imbalance.

The work piece 1 is rotated by an over-head belt drive system, a side view of the system being shown in FIG. 5. The work piece 1 is driven by means of a moving, flexible heavy, long-life belt 29 which is moved down against and in contact with the work piece 1 by means of handle 29" about pivot point 26'. Except for the lower, work contacting section of the belt 29, it is enclosed within the movable housing 29'. The belt is driven by means of the electric motor 26 (seen in FIG. 1) which is located along side of the housing 29' at its lower end. Such a drive system requires no adjustments (except for positioning about pivot point 26') or couplings and can be used to drive rough, tapered or irregular surfaced work pieces as well as ideal ones. The motor 26 has a variable speed control which lets the operator balance the work piece at the optimum spin and double check for balance at different spins, and can usually drive the belt at speed within the diametral range.

The particulars of the electronic system 42 of the machine forms no real part of the present invention. The user or the manufacturer of the present invention may install whatever type of recording and analyzing device as is desired.

When not in use, the swing plate 20 and its associated elements can be locked or stopped in a fixed position by the swing locking or set screw 34 at will.

As best seen in FIGS. 5 and 6, the drive motor 26 and motor base 27 are supported by a motor support bracket 28, and this support bracket 28 is slotted (note FIG. 6) in a direction parallel to the lathe bed to allow for an adjustment in the location of the drive motor 26 and the point of contact on the work piece 1 of the power friction belt 29. The drive motor 26 is supported by movable motor base 27 that in turn is secured to the motor support bracket 28 by means of cap screws 45 that lock the motor secure when the proper adjustment is made to position the belt 29 at the desired point of contact. The motor and drive system is mounted on support pedestal 2 by means of support arm 31.

The work 1 to be balanced is held secure onto the rollers 25 by means of hold down clamps 24 which keep the work (rotor, shaft, mandrel, etc.) from jumping out of the machine while it is rotating. Each hold down clamp 24 is equipped with adjusting arms 41 and adjusting screw 43 to accommodate variations in size of the work 1. At the lower end of the adjusting members 41, 43 is a contact bar 40 which is in contact with the work piece 1 and can be made of a relatively soft material such as micarta to prevent any damage to the work piece. Alternatively a moving bearing surface could be provided on contact arm 40. The adjusting screw shaft 43' is journaled in the clamp structure 24' so that it moves up and down with respect to it, relatively and correspondingly raising and lowering contact arm 40.

In order to engage and disengage the hold down clamp 24, its upper structure is pivotably connected (note arrows in FIG. 2) about pivot point 44 and is locked into operative position by pin 45.

As schematically shown in FIG. 1, the support pedestals 2, 3 are also equipped with lifting lines 33 that are used when the machine is mounted or removed from the lathe 10. When it becomes necessary to remove the balancing machine from the lathe, the pedestals 2, 3 are quickly slid together, causing the male locking arm 36 to enter the female locking arms 31. The two are held and locked together by the lock pin 32. The mounting shoes 13 and hold down bolts 14 then are released and the balancing machine can be quickly removed from the lathe by means of lifting liner 33. The upper end of the lifting lines 33 can be connected to an appropriate over-head gantry, winch or crane system (not illustrated) and the support pedestal stored up and out-of-the-way during non-use but being readily and immediately available for use when needed.

A second embodiment of the balancing accessory machine of the present invention, designed for use with heavier work pieces is shown in FIG. 7. The larger machine of FIG. 7 employs the same basic principles and structure as the embodiment of FIG. 1, but is equipped with a larger drive motor 26' which, through a universal drive shaft coupling 30, in-line and directly drives the work piece 1'. On this unit the electronic panel board 42' is mounted under the motor 26' in the base of the larger double shoed (13', 13'') front pedestal 2'. It should be noted that like or analogous elements of the second embodiment are numbered similarly to the first embodiment except primed, and detailed discussions thereof are deemed unnecessary.

Thus both embodiments use identical support pedestals 3 (3'; not illustrated) and for that matter, support pedestals 2, 3 and 2', 3' are substantially identical with the general exception of the motor drive and electronics systems being included on pedestal 2, 2'.

Obviously many of the physical, mechanical or structural details of the above described embodiments are merely representative and great variations in them are possible.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A balancing machine accessory for use on and with a lathe having extended, parallel, horizontally disposed, support bars as part of its basic, base structure, said balancing machine accessory being used to detect any imbalance in a work piece designed to be symetrically balanced about a central axis, comprising:

at least two support pedestals each having two basic sections, an upper section and a lower section, said upper section being mounted on and carried by said lower section and being mechanically movable in a vertical direction with respect to said lower section; said upper and lower sections having interdigitating sub-sections which complement and mate with each other in face-to-face engagement to allow for lateral support regardless of the relative positions of said upper and lower sections, said sub-sections on one of said support pedestal sections consisting of four identical projections which are evenly and analogously spaced two on each side in both the lateral and longitudinal horizontal directions in said one of said support pedestal sections;

work piece mounting means for mounting and holding the work piece while it is being rotated positioned on said upper section and including mechanical system means for detecting any imbalance in the work piece as it is being rotated; and mounting shoe means connected to said lower section on each of said support pedestals for mating with and mounting the support pedestal on the support bars of the lathe itself, said mounting shoe means allowing the support pedestal to be moved along the support bars of the lathe, allowing the positions of said support pedestals to be mechanically adjusted.

2. The balancing machine accessory of claim 1 wherein there is further included screw means connected between said upper and lower sections, the upper section being moved relative to said lower section by rotating said screw means.

3. A balancing machine accessory for use on and with a lathe having extended, parallel, horizontally disposed, support bars as part of its basic, base structure, said balancing machine accessory being used to detect any imbalance in a work piece designed to be symetrically balanced about a central axis, comprising:

at least two support pedestals;

work piece mounting means for mounting and holding the work piece while it is being rotated positioned on the upper parts of said support pedestals and including mechanical system means for detecting any imbalance in the work piece as it is being rotated;

mounting shoe means connected to the lower parts of said support pedestals for mating with and mounting the support pedestals on the support bars of the lathe itself, said mounting shoe means allowing the support pedestals to be moved along the support bars of the lathe, allowing the positions of said support pedestals to be mechanically adjusted;

lifting line means on at least one of said support pedestals for raising and lowering said support pedestal onto and away from the lathe bed as desired; and locking means on said support pedestals for locking said two support pedestals together after they have been slid together in face-to-face contact or juxtaposition.

4. The balancing machine accessory of claim 3 wherein said mounting shoes comprise multiple parts which are designed to precisely mate with the support bars of the lathe in face-to-face relationship, said parts being removable and replaceable; whereby the same support pedestals can be used with lathe having differently configured support bars.

5. The balancing machine accessory of claim 3 wherein there is further included electronic system means for monitoring, interpreting, and analyzing said mechanical system means associated with said support pedestals to thereby identify and locate any imbalance.

6. The balancing machine accessory of claim 3 wherein there is further included on each support pedestals a hold down clamp for locking the work piece onto said work piece mounting means.

7. The balancing machine accessory of claim 3 wherein said mechanical system includes a swinging box mounted on said upper section and being supported thereon at pivoted points which allowing swinging motion relative thereto, said work piece mounting means comprising freely rotatable, vertically disposed rollers mounted in said swinging box, the work piece riding on the peripheral edges of the rollers when it is rotated, any imbalance in the work piece causing said swinging box to swing with respect to said upper section.

8. The balancing machine accessory of claim 3 wherein said locking means comprises a male locking arm on one of said support pedestals and two spaced, female locking arms on the other, the spacing of said female locking arms being approximately equal to the thickness of said male arm, whereby the male arm can be placed between said female arms; and ancillary locking means for locking all three of said arms together.

9. The balancing machine accessory of claim 8 wherein each of said arms includes an aligned aperture therein and said auxiliary locking means comprises a locking pin placed in said apertures.

10. A balancing machine accessory for use on and with a lathe having extended, parallel, horizontally disposed, support bars as part of its basic, base structure, said balancing machine accessory being used to detect any imbalance in a work piece designed to be symetrically balanced about a central axis, comprising:

at least two support pedestals;

work piece mounting means for mounting and holding the work piece while it is being rotated positioned on the upper parts of said support pedestals and including mechanical system means for detecting any imbalance in the work piece as it is being rotated;

mounting shoe means connected to the lower parts of said support pedestals section for mating with and mounting the support pedestals on the support bars of the lathe itself, said mounting shoe means allowing the support pedestals to be moved along the support bars of the lathe, allowing the positions of said support pedestals to be mechanically adjusted; and a motor drive system associated with said support pedestals for rotating the work piece while it is mounted on said work piece mounting means; said motor drive system being mounted on one of said support pedestals by means of a slotted bracket, the slots in said bracket being positioned parallel to the lateral dimension of said support pedestal whereby the position of the motor drive system can be adjusted along the work piece as desired.

11. A balancing machine accessory for use on and with a lathe having extended, parallel, horizontally disposed, support bars as part of its basic, base structure, said balancing machine accessory being used to detect any imbalance in a work piece designed to be symetrically balanced about a central axis, comprising:

at least two support pedestals each having two basic sections, an upper section and a lower section, said upper section being mounted on and carried by said lower section and being mechanically movable in a vertical direction with respect to said lower section;

screw means connected between said upper and lower sections, the upper section being moved relative to said lower sections, the upper section being moved relative to said lower section by rotating said screw means;

lifting line means on each support pedestal for raising and lowering said support pedestals onto and away from the lathe bed as desired;

work piece mounting means for mounting and holding the work piece while it is being rotated positioned on said upper section and including mechanical system means for detecting any imbalance in the work piece as it is being rotated;

electronic system means for monitoring, interpreting, and analyzing said mechanical system means associated with said support pedestals to thereby identify and locate any imbalance;

a hold down clamp on each support pedestal for locking the work piece onto said work piece mounting means;

mounting shoe means connected to said lower section for mating with and mounting the support pedestal on the support bars of the lathe itself, said mounting shoe means allowing the support pedestal to be removed along the support bars of the lathe, allowing the positions of said support pedestals to be mechanically adjusted, said mounting shoes comprise multiple parts which are designed to precisely mate with the support bars of the lathe in face-to-face relationship, said parts being removable and replaceable; whereby the same support pedestals can be used with lathe having differently configured support bars;

a motor drive system associated with said support pedestals for rotating the work piece while it is mounted on said work piece mounting means, said motor drive system being mounted on one of said support pedestals by means of a slotted bracket, the slots in said bracket being positioned parallel to the lateral dimension of said support pedestal whereby the position of the motor drive system can be adjusted along the work piece as desired; and locking means on said support pedestals for locking said two support pedestals together after they have been slid together in face-to-face contact or juxtaposition.

12. The balancing machine accessory of claim 11 wherein said mechanical system includes a swinging box mounted on said upper section and being supported thereon at pivoted points which allowing swinging motion relative thereto, said work piece mounting means comprising freely rotatable, vertically disposed rollers mounted in said swinging box, the work piece riding on the peripheral edges of the rollers when it is rotated, any imbalance in the work piece causing said swinging box to swing with respect to said upper section.

* * * * *